United States Patent
Maattanen

(10) Patent No.: US 9,636,780 B2
(45) Date of Patent: May 2, 2017

(54) METHOD TO WELD TWO SUBSTRATE PIECES TOGETHER USING A FOCUSED LASER BEAM

(71) Applicant: Primoceler Oy, Tampere (FI)

(72) Inventor: Antti Maattanen, Tampere (FI)

(73) Assignee: Primoceler Oy, Tampere (FI)

( * ) Notice: Subject to any disclaimer, the term of this patent is extended or adjusted under 35 U.S.C. 154(b) by 0 days.

(21) Appl. No.: 14/687,230

(22) Filed: Apr. 15, 2015

(65) Prior Publication Data

US 2015/0298256 A1    Oct. 22, 2015

(30) Foreign Application Priority Data

Apr. 17, 2014 (FI) .................................. 20140115

(51) Int. Cl.
   *C03B 23/20*     (2006.01)
   *B23K 26/20*     (2014.01)
   (Continued)

(52) U.S. Cl.
   CPC .......... *B23K 26/206* (2013.01); *B23K 26/244* (2015.10); *B23K 26/324* (2013.01); *B23K 26/57* (2015.10); *B23K 37/0426* (2013.01); *C03B 23/203* (2013.01); *C04B 37/001* (2013.01); *C04B 37/042* (2013.01);
   (Continued)

(58) Field of Classification Search
   None
   See application file for complete search history.

(56) References Cited

U.S. PATENT DOCUMENTS

| 4,879,450 | A | 11/1989 | Valentin et al. |
| 2005/0021170 | A1* | 1/2005 | Gustafsson .......... B23K 9/0026 700/186 |

(Continued)

FOREIGN PATENT DOCUMENTS

| FI | 20105539 | A | 11/2011 |
| FI | 123806 | B | 10/2013 |
| FI | 20120420 | B | 10/2014 |
| JP | 2004188802 | A | 7/2004 |

OTHER PUBLICATIONS

Extended European Search Report, Application No./Patent No. 15163855.8-1702/2962804, mailed Feb. 3, 2016, 7 pages.
(Continued)

*Primary Examiner* — Mark Halpern
(74) *Attorney, Agent, or Firm* — Ziegler IP Law Group, LLC

(57) ABSTRACT

Two substrate pieces are welded together with a focused laser beam. One of the pieces is transparent in the wave length of the laser beam. The two pieces are pressed together so the tops of the roughness of the joining surfaces become level and both a uniform and pocket like air layer is removed from between the surfaces. The focal point of the laser beam is focused in the common boundary surface of the substrate pieces and the pieces are set to movement in relation to the laser beam so that the focal point advances in the boundary surface according to the shape and length of the weld. The energy of the focal point melts the material of the two pieces at the same time. When the melts mix and harden, a weld is formed that joins the pieces hermetically and goes round the third piece(s) isolating it hermetically.

8 Claims, 3 Drawing Sheets

Figure 1:
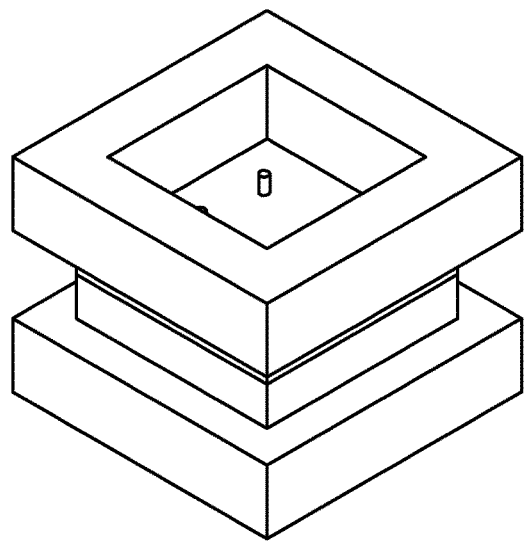

(51) Int. Cl.
  *C03B 23/203* (2006.01)
  *B23K 37/04* (2006.01)
  *B23K 26/324* (2014.01)
  *B23K 26/244* (2014.01)
  *C04B 37/00* (2006.01)
  *C04B 37/04* (2006.01)
  *B23K 26/57* (2014.01)
  *B23K 103/00* (2006.01)

(52) U.S. Cl.
  CPC ...... *B23K 2203/54* (2015.10); *B23K 2203/56* (2015.10); *C04B 2235/665* (2013.01); *C04B 2235/9653* (2013.01); *C04B 2237/345* (2013.01); *C04B 2237/348* (2013.01); *C04B 2237/62* (2013.01)

(56) References Cited

U.S. PATENT DOCUMENTS

| | | |
|---|---|---|
| 2009/0258233 A1 | 10/2009 | Bolser et al. |
| 2010/0047587 A1* | 2/2010 | Itoh ............... B29C 65/1654 428/426 |
| 2012/0147538 A1 | 6/2012 | Kawanami et al. |
| 2013/0070428 A1 | 3/2013 | Kangastupa et al. |
| 2013/0256285 A1* | 10/2013 | Baxter ............... B23K 26/048 219/121.72 |
| 2014/0174128 A1* | 6/2014 | Maattanen ......... B23K 26/046 65/29.11 |

OTHER PUBLICATIONS

Office Action, Finland Patent Office, Application No. 20140115, mailed Nov. 13, 2014, 7 pages.

* cited by examiner

B-B

C-C

METHOD TO WELD TWO SUBSTRATE PIECES TOGETHER USING A FOCUSED LASER BEAM

The object of this invention is a method to weld two substrate pieces together using a laser beam so that at least one of the pieces to be welded is transparent in the wave length of the laser beam that is used and that the pieces to be welded are placed against each other for the welding.

About the pieces to be welded only one or both are transparent totally or partly in the wave length of the laser beam that is used. As an example of the pieces to be welded it can be mentioned the substrate pieces where there is installed between them an optic apparatus or a semiconductor component. So they can be composed only of substrate or they can be composed of a substrate layer and a conductor layer that has been joined to it so that these conductor layers are against each other in the mutual boundary surface of the pieces to be welded together. In general, metals are used as the material of the conduct surfaces. Extensively taken, the substrates can be any material or material composition where the melting and hardening can happen by using a focused laser beam. They can be homogeny or composed of areas and/or layers of different materials. Semiconductors of glass and/or silicon substrate can be mentioned as an example that are used in micro electronics or glass sheets or a third component that is put between them, e.g. an optic apparatus. It is possible to close and pack hermetically optic apparatuses and other components using the method of the invention.

The usages of the invention can be both joining together by welding such pieces where the surfaces of the mutual boundary surface are level and such pieces where the surfaces to be joined together are 3D. This diversion from the level surface can be caused by an intentional forming of a surface or by a diversion for some reason of a surface that was intended to be level.

According to the known technique, the welding together of the before mentioned pieces is done so that the height position of the focus of the laser beam is changed as the welding proceeds so that it advances in the common boundary surface.

The before described known technique has been presented for instance in patent publication FI20120420. The technique that has been presented in this publication is based on that the height data before the welding point is fed to the unit that changes the height position of the laser beam so that the height of the welding point follows the position of the common boundary area with certain steps.

On the other hand, it is common nowadays that the surfaces to be welded together are treated with a fine mechanics apparatus individually so that a sufficiently tight contact of the surfaces is obtained.

The biggest drawback of the known technique can be seen that even thought a sufficiently good quality of the surfaces to be welded can be obtained, the realization of this thing is very difficult and costly. Even small dirtiness and even very small surface roughness cause air gaps and pockets to be formed between the surfaces to be welded and as a consequence to get a tight welding in these areas demands in the known technique special measures. On the other hand, it is possible that dirtiness remains between the surfaces and these unrelated particles hinder an airtight welding seam to be formed. This problem is eliminated with the known technique by working the surfaces to be welded using very expensive and time consuming methods in order to obtain a sufficiently good contact between the surfaces and thus getting a hermetic end result.

The intention of this invention is to obtain such a method that drawbacks of the known technique are avoided. It is characteristic for the solution according to the invention what has been presented in the characterizing part of the claim 1.

A noteworthy advantage is obtained by using the method of the invention because the preparatory measures for the welding can be performed very quickly and cheaply. So using this method we reach without expensive and time consuming measures the situation where there are not between the surfaces to be welded harming air gaps and pockets and the surfaces are not separated from each other by rubbish or other uncleanness or there is for the purpose suitable essentially even air gap.

In this document the term "height value" means the distance of a certain point from a certain comparison level, like for example basic level not depending on in which position this comparison level is.

Figure 2:
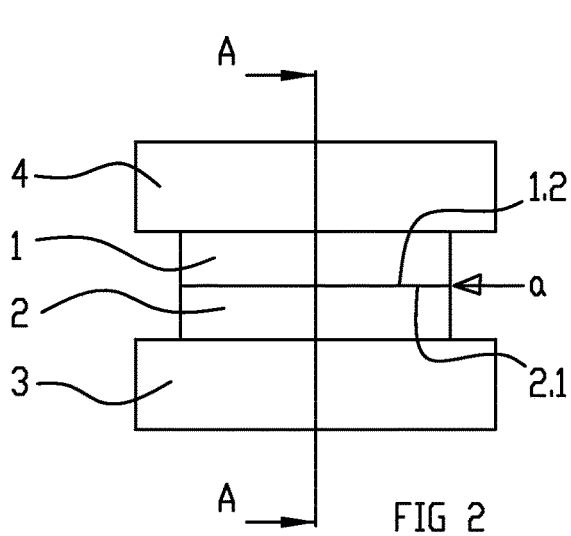
Figure 3:
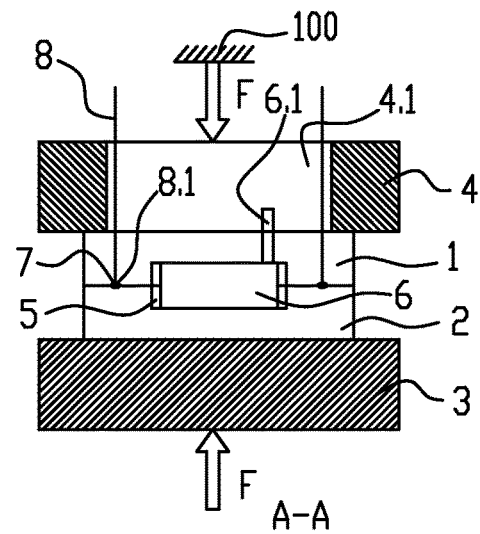
Figure 4:
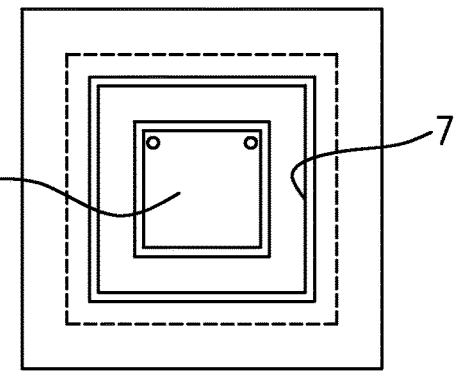
Figure 5:
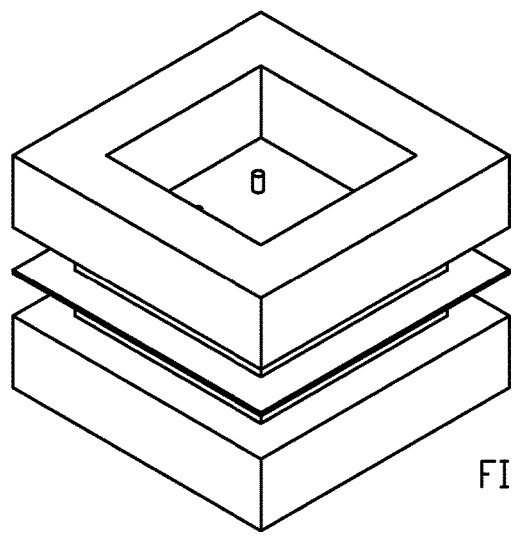
Figure 6:
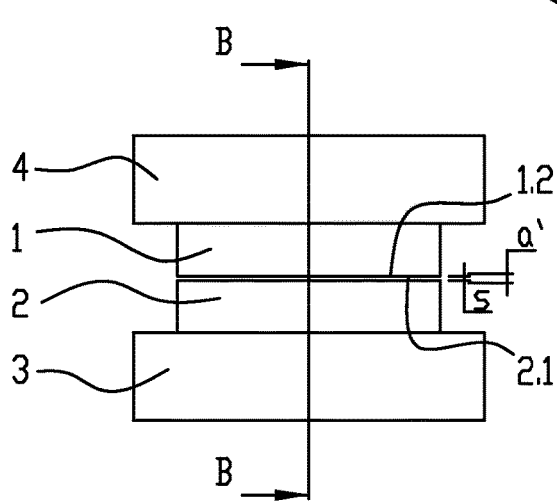
Figure 7:
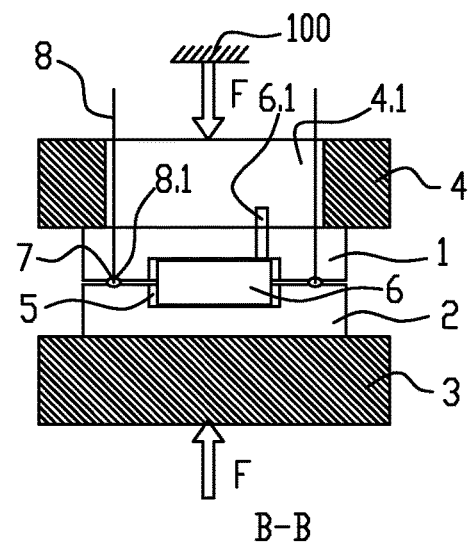
Figure 8:
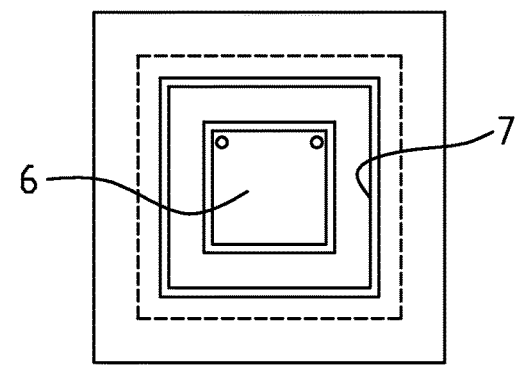
Figure 9:
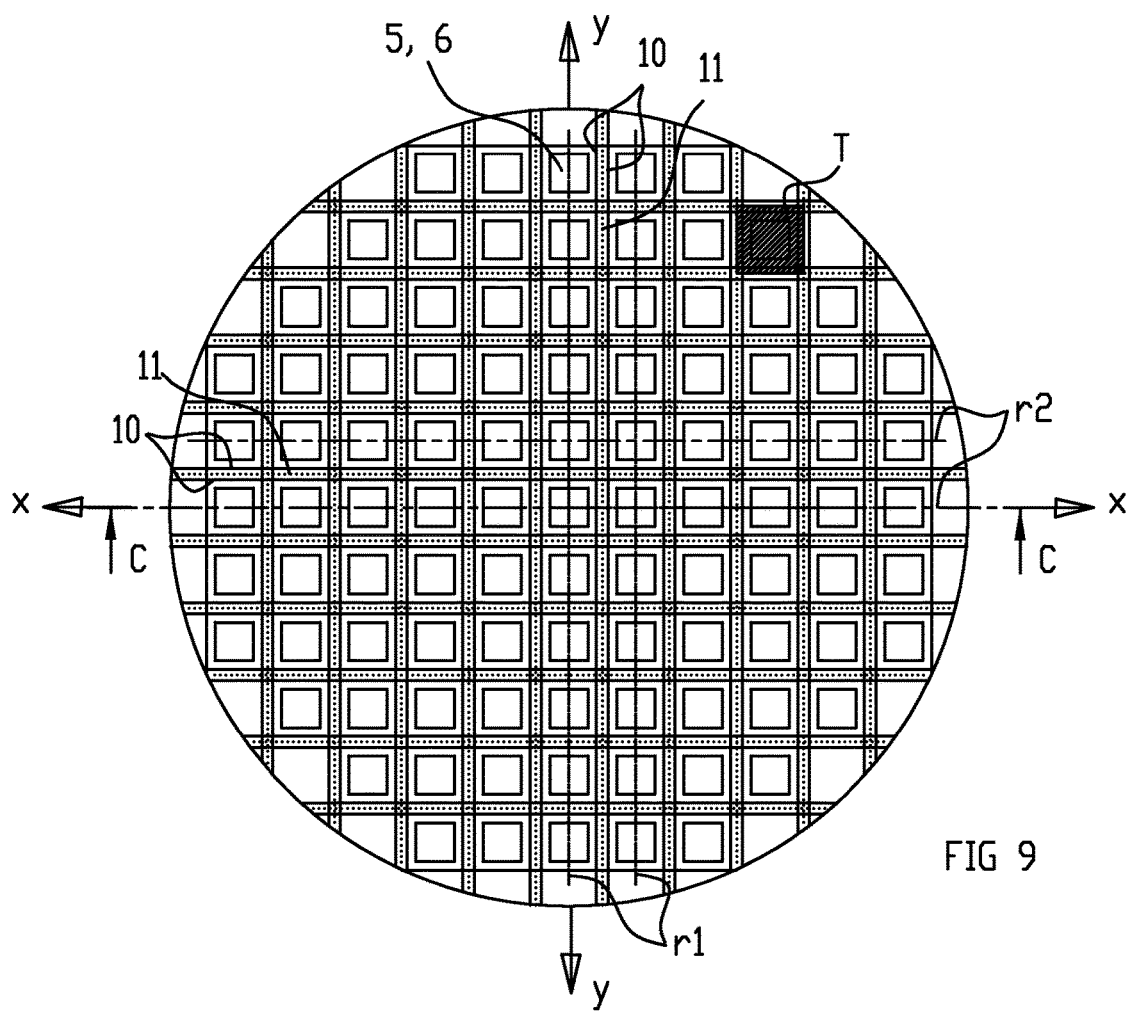
Figure 10:
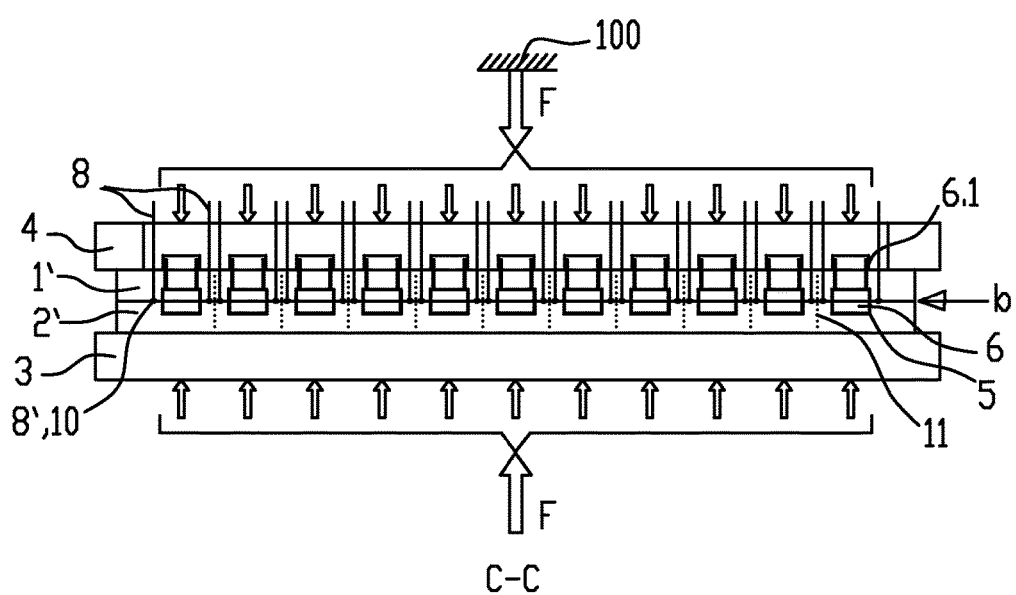

The invention is described in the drawings of this application as follows:

FIG. 1 presents in 3D one setting to perform the method according to the invention, FIG. 2 presents the before mentioned setting seen directly from a side, FIG. 3 presents a cross section of this setting from the position A-A of the FIG. 2, FIG. 4 presents the before mentioned setting seen directly from above, FIGS. 5-8 present another setting in the same way as FIGS. 1-4 to perform the method according to the invention, FIG. 9 presents a third setting to perform the method according to the invention, FIG. 10 presents a cross section of the before mentioned setting in the position C-C of the FIG. 9.

The following describes realizing some advantageous solutions of the method according to the invention by referring to the above figures.

FIG. 1 describes one setting where two glass pieces to be welded together using a focusing laser beam have been placed ready to be welded. There is above the first level surface piece 1 and under it another level surface piece 2 and they have been placed upon each other upon a level surface support organ 3 and there has been placed upon the before mentioned pieces a level surface pressing organ 4. To the pressing organ, it has been directed using a pressing apparatus 100 a directly downwards effective pressing power F and as the support organ remains in its place because of a same amount of counterforce, a balance is reached where the second surface 1.2 of the first piece and the first surface 2.1 of the second piece are pressing each other so that the tops of their surface roughness (Ra) are pressed down at least in the area of the welding seam and from between these surfaces in this area the continuous air gaps and pockets have been removed. When the pressing power F is set suitable and directed to the first and second piece so that the surfaces 1.2 and 2.1 form a continuous common boundary surface without continuous or pocket like air layer, it is possible to perform a totally hermetic welding uniting the first and the second piece inside these pieces formed closed place 5 situated third piece 6, in this example around an optic apparatus. FIG. 3 presents the welding 7 that has been formed around the optic apparatus, which welding in this case is a closed circular welding and in order to obtain it, a focused laser beam 8 has been directed to the welding point through the center opening 4.1 of a non-transparent pressing organ 4. In this example, the laser beam has been led to its target through the transparent first piece 1 and its focal point 8' has been focused to the common boundary surface a level. When the circular welding has hardened and cooled, the product T consisting of the first and the second piece and the optic apparatus can be released from the compression. The welding keeps the pieces together and the optic apparatus hermetically protected inside the glass sheets. The data transfer organs 6.1 of the optic apparatus, that is the third piece 6, have been led outside the product through the first piece through the lead-ins that have been made to it. FIG. 4 presents the before mentioned setting directly from above and it can be seen there that in this example the welding 7 is a circular welding of the shape of a square. The welding around the third piece 6 can also be made as a circular welding of some other shape or for instance with singular welding lines that cross in the corners.

The data transfer organs 6.1 can alternatively be led also through the second piece 2 and divide to go forward through both of the pieces to be welded. One alternative is to set them to go outside the product T in its boundary surface a.

If the surface 1.2, 2.1 qualities of the pieces to be pressed together are sufficiently even they can reach by the effect of the pressing force F a mutual molecule binding that can keep these surfaces in an advantageous before mentioned position even though the pressing force F is removed after this binding has formed. In other words, in a situation that is like the situation of the mentioned example the pressing organ 4 can even be removed after pressing before doing the welding. In this case, it is not necessary in shaping the pressing organ 4 to take into account to get the laser beam through it to the welding point.

By pressing together the pieces to be welded as described before can in addition to smoothing highest points of the surfaces to straighten the pieces to be welded together so that a certain welding can be performed without adjusting the laser beam focal point. For instance the loose contact of the surfaces caused by rubbish particles can be straightened sufficiently straight using the pressing force F. One way to detect that a sufficient straightness of the surfaces has been reached is to notice that the so called Newton rings have disappeared from between the together pressed glass sheets to be welded together.

It is essential in order to get a right kind of welding that the laser beam is focused to the common boundary surface a of the pieces to be welded so that the melting material comes from both of the pieces that meet in this surface. When the welding advances in the before mentioned example case by moving the laser beam in relation to the welding target it is not necessary to alter the height position of the focal point 8' of the laser beam 8 because of the flatness of the boundary surface a, but when the method according to the invention is used with surfaces that deviate from flatness or with deviating 3D surfaces the height position of the focal point of the laser beam can be altered using methods of the known technique. One of these means is the method that has been presented in the patent application FI20120420. In that publication, a method is presented that is used to measure, in front of the advancing welding, the height position of the common boundary surface or area with certain intervals and these values are fed to a laser beam focal point regulating device through a computer and the regulating device alters the before mentioned focal point at each measuring point to correspond its height position.

FIGS. 5-8 present another application according to the invention. In this case, the material of the first piece 1 and the second piece 2 is sapphire and it is desired to leave a thin uniform air gap between their opposite surfaces 1.2, 2.1 because it is advantageous from the point of view of the forming of the plasma when welding together sapphire pieces. The realization of this application differs from the first presented application in that the first piece and the second piece are not pressed together using the pressing force F so that the molecule bindings would form between the contact surfaces or that the surfaces would be otherwise in a corresponding mutual position but instead, the surfaces are desired to be certain distance from each other and the binding between them would come from the tops of the surface roughness. Ordinarily, two smooth surface glass sheets that have been placed upon each other according to this example and that are under the effect of the gravity remain loose from each other because of for instance the roughness of the surfaces, the distance being over hundred or even many hundred nm from each other so that if this cap is desired to get thinner, treatment of surfaces or pressing force F is needed. In the case of this example, it is wanted to obtain with the location of the welding 7 uniting the first piece and the second piece 1, 2 to obtain the situation where this distance is within certain tolerances, that is essentially constant. In the application that has been described here this situation is obtained by pressing the mentioned pieces together with a pressing force F and the thickness s of the air gap is monitored and measured optically during the welding process or/and before it. In this case, the laser beam 8 is focused to the common boundary area à of the pieces to be welded which boundary area consists of the gap between the surfaces 1.2 and 2.1 and the before mentioned surfaces so that the melted material is formed from both pieces that meet in this area and when hardening joins tightly together the first piece 1 and the second piece 2. The welding advances otherwise in the same way as in the above told example but now the height position of the focal point 8' has been adjusted essentially for the average height position of the before mentioned boundary area a' and it is adjusted as the welding advances to advance in accordance with the known technique essentially in this average height.

In the situation that has been told above the pressing force F can either be kept constant or it can be changed during the welding if necessary because of the geometries of the first and the second piece 1, 2 and the capabilities of the welding setting. Such an application of the invention is neither excluded where the pressing force F is removed before welding when with the help of the pressing force F it has been achieved a balance situation that maintains a suitable gap for the welding process. However, it is not question of a molecule binding in this kind of case.

A third example of the usage of the method according to the invention is to join together two such half-finished products where there has been placed between them many third pieces 6, as in this example optic apparatuses and whereof is formed after the welding many separate products T where each of them is hermetically protected. In FIGS. 9 and 10 there has been presented a setting where there are upon each other two diameter about 100-150 mm glass sheets. Inside these glass sheets, inside the combination of the first piece 1' and the second piece 2' formed spaces 5, in each of them a third piece 6 has been placed that is thus an optic apparatus in the corresponding way as in the before told examples having smaller first and second pieces have inside in places 5. These optic apparatuses are many in straight lines between the first piece and the second piece to be welded together. These lines advance in this example through the sheets in 90 degrees to each other in two directions x-x, y-y. When using the method according to the invention, the first piece 1' and the second piece 2' are pressed together between the support organ 3 and the pressing organ 4 with the pressing force F directed vertically with the pressing equipment 100 to the pressing organ. The pressing organ 4 is an inflexible sheet and it has been chamfered to it hollows for the data transfer organs. A pressing force F is directed to the pressing organ which force comes to the scope of all the half-finished products so that a molecule binding is formed between the facing surfaces of the first and the second piece 1', 2'. After this, the pressing can be stopped and the pressing organ can be removed from the setting. Now, the laser beam has an unhindered access to the points to be welded through the first piece 1'. The welding of the first piece and the second piece 1', 2' can be performed either to the spaces between the third pieces 6 forming lines r1, r2 with crossing segment welding or around every third piece 6 made separate circular welding. After welding, the products T are cut off from the together welded sheets and their construction is what has been described in earlier examples, hermetically encapsulated optic apparatuses containing entities. In this example, the cutting is done along the cutting lines 11 between two neighboring welding segments. It can also be done so that the cutting goes in the middle line of the welding seam and so there remains on both sides of the cutting line 11 some air tight welding 10.

The pressing force F can also in a case like the above told example be alternatively kept during the welding. In that case, the effective points of the pressing force F on the pressing organ 4 and the connected parts of the power apparatus 100 must always be situated so that the laser beam 8 has an unhindered access to the advancing lines of certain welds. So the pressing organ 4 can be even in this case of non-transparent or transparent material. If it is non-transparent it is obligatory to make holes to it for the laser beam advancing lines.

It is possible to apply the method according to the invention in very many different ways. The production of the pressing force F, directing it to the pressing organ 4 or to the pieces to be welded, the amount of the pressing force, the quality of the contact of the surfaces and the directing of the laser beam 8 to the target can be realized case by case to obtain advantageously the wanted end result. To produce and maintain the pressing force F, the pressing apparatuses 100 of the known technique can be used. According to the case, the pressing can be done with an apparatus that is composed of one or more pressing elements and force transferring points or with many separate pressing apparatuses. The pressing apparatus 100 can also be composed of a support organ 3 and/or a pressing organ 4 and then these organs need not be in separate parts.

The laser beam 8 can also be focused to the target differently from the above examples through the second piece 2 and then the support organ 3 is done so that the laser beam has an unhindered access to its target.

By a uniform air layer it is also meant an air layer where this unity is cut only by the roughness tops of the surfaces to be welded together reaching each other in different sides of this air layer.

In the above examples it has been talked about pieces upon each other to be welded together. The method according to the invention can also be done with pieces side by side to be welded together. In other words, it is essential that these mentioned pieces are against each other and that the pressing force F is directed essentially normally towards the common boundary surface or boundary area of these pieces.

The size of the focused point of the laser beam 8 that is used in the method according to the invention is in the size class of 1-10 μm but its size can be in certain cases different from these limit values. In the above mentioned cases the height of the melted material and thus the height of the weld seam is in the size class of 1-200 μm.

The thicknesses of the pieces 1, 2 (1', 2') can vary very much. For instance the first piece 1 that has been made of glass can be max at least 3 mm and the thickness of the second piece 2 does not have limits.

The invention is especially suitable for welding glass and/or semiconductor substrates, like silicon, technical glasses, melted silicon oxide, borosilicate, calcareous glass, sapphire, ceramic materials like zirconium oxide, LiTaO etc and their combination.

The method according to the invention can be used either for isolating hermetically separate components or for isolating hermetically parts that have been fixed to the piece or pieces to be welded. The conducting materials of the first and the second piece 1 and 2 or the components that are used between them can be for instance of chrome, copper, silver, gold, molybdenum or indium tin oxide or a combination of these.

The method according to the invention can be used largely for instance to protect optic apparatuses, semiconductor chips and micro chips against the effect of the outside oxygen and moisture. As an example of this kind of pieces, 0.1-3 mm thick optic apparatuses can be mentioned and also semiconductor chips and micro chips where the conductor metal layers are about 0.1-5 μm thick. About all these, the claims use a general term: the third piece 6.

It should be noticed that in these documents mentioned and in all other pieces to be welded together the laser beam 8 is led through the substrates of the first piece 1 and the second piece 2 and thus this substrate must be transparent within the wave length of the laser beam 10 that is used.

It should also be noticed that even though this description keeps to one type for the invention advantageous application this does not in any way want to limit the usage of the invention only for this type of example but instead many variations are possible within the inventive idea defined in the claims.

The invention claimed is:

1. A method, comprising:
providing a first piece, which has a first surface,
providing a second piece, which has a second surface,
pressing the first piece and the second piece together by using a pressing organ such that binding is achieved between the first surface and the second surface, wherein the first surface and the second surface form a common boundary;
removing the pressing organ, and
welding the first piece and the second piece together by focusing a laser beam to the common boundary through the first piece,
wherein the pressing organ is removed before said welding,
the first piece and the second piece are moved in relation to the laser beam so that a focal point of the laser beam advances in the common boundary, and
an energy of the focal point of the laser beam melts material of the first piece and the second piece at the same time so as to form a weld, which joins hermetically the first piece and the second piece.

2. The method according to claim 1, wherein the first and second surface have a surface roughness, and the method comprises setting a pressing force of said pressing such that highest points of the surfaces are smoothed at least partly.

3. The method according to the claim 1 wherein particles remain between the first and second surface, and the method comprises using a pressing force of said pressing such that the particles get pressed down at least partly.

4. The method according to claim 1 comprising pressing the first and second surface to certain distance from each other by using a pressing force, wherein the pressing force is adjusted and directed so that an air gap of equal and essentially same height is formed between the first and second surface.

5. The method according to claim 1 wherein the first and second surface are not plane surfaces and the method comprises altering a height position of a focal point of the laser beam during the welding so that the focal point advances at the common boundary.

6. The method according to claim 1 wherein a material of the first piece is selected from a group consisting of glass, technical glass, semiconductor, silicon, fused silicon oxide, borosilicate, calcareous glass, sapphire, ceramic material, zirconium oxide and LiTaO.

7. The method according to claim 1 wherein a material of the second piece is selected from a group consisting of glass, technical glass, semiconductor, silicon, fused silicon oxide, borosilicate, calcareous glass, sapphire, or ceramic material, zirconium oxide and LiTaO.

8. The method according to claim 1, wherein the second piece comprises a substrate layer and a conductive layer.

* * * * *